United States Patent Office 3,076,028
Patented Jan. 29, 1963

3,076,028
BENZILIC ACID HYDRAZIDES AS AMINE OXIDASE INHIBITORS
Claire H. Yates, Verdun, Quebec, and Lloyd M. Thompson, Pointe Claire, Quebec, Canada, assignors to Charles E. Frosst & Co., Montreal, Quebec, Canada, a corporation of the Province of Quebec
No Drawing. Filed May 22, 1961, Ser. No. 111,457
Claims priority, application Great Britain May 23, 1960
4 Claims. (Cl. 260—559)

The present invention relates to novel hydrazide derivatives.

The products of the present invention are $N^1$-substituted hydrazides which may be represented by the following general formula:

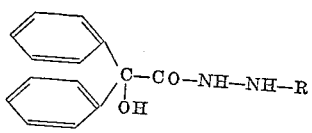

I wherein R stands for the ethyl, isopropyl, sec-butyl, cyclohexyl and $\alpha,\alpha'$-dimethylisopropyl radicals.

The products of the present invention are prepared by reducing under appropriate conditions hydrazones of the general formula:

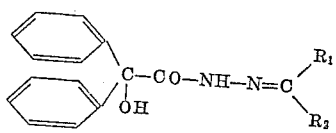

II wherein $R_1$ stands for hydrogen methyl or ethyl and $R_2$ stands for methyl or ethyl, and

stands for cyclohexyl, whereby the —N=C grouping becomes saturated. As an example of conditions whereby such a reduction may be effected satisfactorily there may be mentioned the use of hydrogen in the presence of a metal catalyst, or of some effective reducing agents as the methyl hydrazides, for example, sodium borohydride, lithium aluminum hydrazide, and the like. The starting materials of the Formula II have been found to be most conveniently prepared by allowing the hydrazide of benzilic acid, i.e. benzilhydrazide, to react with the appropriate aldehyde or ketone. In carrying out this reaction, an inert solvent, for example, a lower alcohol, may be included particularly in the case of the higher boiling aldehydes or ketones or of the very volatile aldehydes. In cases where the reaction proceeds too slowly for practical effectiveness, the rate may be increased by including acetic acid or other agents of the same nature as a catalytic agent.

The hydrazides of the derivatives of the present invention may be converted to the acid addition salts by contacting the organic base with an acid which will form a non-toxic acid addition salt, for example hydrochloric acid. In many instances, the formation of such salts imparts greatly increased water solubility to these substances.

The antiphlogistic activity of the benzilhydrazides of the present invention was determined by the method described by Sentnikar et al. (Br. J. Pharmacol. 1959, 14, 484). In this method, formaldehyde is injected into the plantar-aponeurosis of rats in order to induce oedema. Compounds to be tested are injected subcutaneously immediately prior to injection and the subsequent appearance or non-appearance of oedema noted over a 6-hour period. In the present case $\beta$-phenylisopropyl hydrochloride was used as the control compound.

The lack of monoamine oxidase inhibition was made by the reserpine antagonism test. In this test 5 mice are injected with reserpine at a dose level of 5 mg./kg. Three hours after injection, activity is measured over a 30 minute period after which the compounds of the present invention were injected intraperitoneally and activity measured for a further 30 minutes. Differences between activity before and after injection of the compounds of the present invention was noted.

The $LD_{50}$ of the compounds of the invention was also determined and reported in Table I along with the results of the reserpine antagonism test and antiphlogistic test.

TABLE I

| Compounds | $LD_{50}$, mg./kg. | Reserpine Antagonism Control, −1. | Dose, i.p., mg./kg. | Antiphlogistic activity | Dose, mg./kg. |
|---|---|---|---|---|---|
| β-phenylisopropyl hydrazine | 140 | 56 | 40 | ++++ | 100 |
| 1-isopropyl-2-benzilhydrazide | 2,200 | 1 | 400 | + | 100 |
| 1-sec-butyl-2-benzilhydrazide | 840 | 1 | 400 | + | 200 |
| Cyclohexyl benzilhydrazide. HCl | 440 | 1 | 400 | + | 100 |
| α,α'-dimethylisopropyl benzilhydrazide, HCl | 570 | 4 | 400 | + | 100 |
| Ethyl benzilhydrazide | 1,750 | 3 | 400 | ++++ | 100 |

The following examples are given to illustrate the preparation of the products of the present invention:

Example I 5 gm. of benzilhydrazide, M.P. 168–169° C., was refluxed with 45 ml. of acetone for 1 hour. The bulk of the solvent was removed and the resulting slurry diluted with water. The yield of 1-isopropylidene benzilhydrazide was quantitative, M.P. 194–195° C.

5 gm. of the above product in 150 ml. of alcohol was treated with 0.675 g. of sodium borohydride at room temperature for 18 hours. The excess reducing agent was then discharged with 10% acetic acid. Water was added and the alcohol removed by distillation in vacuo. The precipitated product was collected, washed with water and dried. The 1-isopropyl benzilhydrazide so obtained melted at 143–145° C., wt. 4.66 g. One recrystallization from alcohol gave material of M.P. 145.5–146.5° C.

Example II

To a warm solution of 12.1 g. of benzilhydrazide in 150 ml. of anhydrous ethanol was added 9.0 ml. of redistilled methyl ethyl ketone, and the solution was refluxed for two hours. The solution was concentrated to one-half volume, and cooled. There was isolated 12.64 g. of 1-sec-butylidene benzilhydrazide, M.P. 158–158.5° C.

The above product was reduced with sodium borohydride in ethanol as described in Example 1, affording 1-sec-butyl benzilhydrazide, M.P. 93–94° C., in 86% yield.

Example III 10 g. of benzilhydrazide, 8.6 ml. of cyclohexanone and 100 ml. of anhydrous ethanol were refluxed for two hours. The solution was concentrated to approximately three quarters volume, and cooled. 1-cyclohexylidene benzilhydrazide was isolated in two crops in 96.5% yield, M.P. 174–178° C. Recrystallization from alcohol afforded material of M.P. 178–179° C. in 94% yield.

By reducing the preceding product with sodium borohydride in ethanol as described in Example I there was obtained a 93.8% yield of 1-cyclohexyl benzilhydrazide, M.P. 155–161° C. A single recrystallization from ethanol raised the melting point to 168.5–169.5° C.

The hydrochloride salt of the 1-cyclohexyl benzilhydrazide was prepared by treating 5 g. of the base in 40 ml. of alcohol with 1.5 ml. of concentrated hydrochloric acid. After standing at room temperature for 20 minutes, the alcohol was removed by vacuum distillation and ether added. The white solid hydrochloride salt was collected.

*Example IV*

10 g. of benzilhydrazide, 8.7 ml. of diethylketone and 100 ml. of anhydrous alcohol were refluxed for two hours, and the solution was evaporated in vacuo. The solid residue was macerated with 40 ml. of ethyl ether, collected, washed with ethyl ether and dried. There was obtained 11.56 g. of 1-($\alpha$-$\alpha'$, dimethylisopropylidene) benzilhydrazide, M.P. 128–128.5° C. Recrystallization from ethyl ether afforded an analytical sample of M.P. 128.5–129.5° C.

7.5 g. of 1-($\alpha,\alpha'$, dimethylisopropylidene) benzilhydrazide was dissolved in 25 ml. of ethanol, and treated with 0.92 g. of sodium borohydride at room temperature. Following acidification with 10% acetic acid, the mixture was dissolved in ethyl ether, washed with water, dilute sodium bicarbonate solution and water, dried over sodium sulfate, and evaporated to a residue. Crystallization from ethyl-ether hexane afforded 89% yield of 1-($\alpha,\alpha'$, dimethylisopropyl) benzilhydrazide, M.P. 85–88° C. Recrystallization from the same solvent raised the melting point to 90–92° C.

The hydrochloride salt was prepared in 90% yield as described in Example 3, M.P. 159–162° C.

*Example V*

To a warm solution of 30 g. of benzilhydrazide in 400 ml. of anhydrous ethanol was added 28 ml. of acetaldehyde, and the solution refluxed for two hours. Following the work-up as described in Example 4, there was isolated 30.6 g. of 1-ethylidene benzilhydrazide, M.P. 167–168° C.

Reduction of 1-ethylidene benzilhydrazide with sodium borohydride in ethanol as described in Example I afforded 1-ethyl-benzilhydrazide in 89% yield, M.P. 129–133° C. Recrystallization from ethyl ether afforded 1-ethyl benzilhydrazide M.P. 143–144° C.

We claim:
1. 1-sec-butyl-2-benzilhydrazide.
2. Cyclohexyl benzilhydrazide HCl.
3. $\alpha,\alpha'$-Dimethylisopropyl benzilhydrazide HCl.
4. Ethyl benzilhydrazide.

References Cited in the file of this patent
UNITED STATES PATENTS
2,928,875   Martin et al. ----------- Mar. 15, 1960

OTHER REFERENCES

Beilstein's Handbuch der Organischen Chemie, vol. 10, First Supplement, page 153 (1932).
Offe et al.: "Z. Naturforsch," vol. 7–b, page 446–462, pages 446–454 relied on (1952) (C/559S).
Yale et al.: Journ. Am. Chem. Soc., vol. 75, pages 1933–42, pages 1933, 1935, 1940 and 1941 relied on (1953) (C/559S).